(12) United States Patent
Leemann et al.

(10) Patent No.: US 6,358,373 B1
(45) Date of Patent: Mar. 19, 2002

(54) PRODUCTION OF POLYAMIDES BY REACTIVE DISTILLATION

(75) Inventors: Martin Leemann, Heidelberg; Volker Hildebrandt, Mannheim; Heino Thiele, Ludwigshafen; Stefan Espig, Schifferstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,799
(22) PCT Filed: Dec. 16, 1998
(86) PCT No.: PCT/EP98/08239
§ 371 Date: Aug. 23, 2000
§ 102(e) Date: Aug. 23, 2000
(87) PCT Pub. No.: WO99/43732
PCT Pub. Date: Sep. 2, 1999

(30) Foreign Application Priority Data

Feb. 27, 1998 (DE) ............................................ 198 08 407

(51) Int. Cl.⁷ .............................. B01D 3/38; C08G 69/04
(52) U.S. Cl. .............................. 203/29; 203/49; 203/92; 203/95; 203/96; 203/DIG. 6; 528/310
(58) Field of Search ........................ 203/49, 29, DIG. 6, 203/92, 95, 96; 528/310

(56) References Cited

U.S. PATENT DOCUMENTS

| 3,900,450 A | | 8/1975 | Jaswal et al. ................ 260/78 |
| 4,568,736 A | | 2/1986 | Curatolo et al. ............ 528/313 |
| 5,596,070 A | * | 1/1997 | Gotz .......................... 528/310 |
| 6,194,538 B1 | * | 2/2001 | Weiss et al. ................ 528/310 |

FOREIGN PATENT DOCUMENTS

EP 479306 4/1992

* cited by examiner

Primary Examiner—Virginia Manoharan
(74) Attorney, Agent, or Firm—Keil & Weinkauf

(57) ABSTRACT

The preparation of polyamides, their oligomers or mixtures thereof, where appropriate with other reaction products, takes place by reacting amino nitriles (A) and, where appropriate, other polyamide-forming monomers and/or oligomers with water (D) in a reactive distillation, wherein the reaction product (P) is discharged from the bottom of the reactive distillation apparatus, and ammonia (N) which is produced and, where appropriate, other low molecular weight compounds which are produced, and water, are taken off overhead.

9 Claims, 1 Drawing Sheet

PRODUCTION OF POLYAMIDES BY REACTIVE DISTILLATION

This application was filed under 35 USC 371 as a National Stage of International Application No. PCT/EP98/08239 filed Dec. 16, 1998. The invention relates to a continuous process for preparing polyamides, their oligomers or mixtures thereof, where appropriate with other reaction products, by reacting amino nitrites and, where appropriate, other polyamide-forming monomers and/or oligomers with water.

The polyamides prepared by direct hydrolytic polymerization of amino nitrites often comprise portions of incompletely hydrolyzed intermediates. These intermediates reduce the molecular weight increase and may have adverse effects on the quality of the polyamide. Their presence is caused inter alia by incomplete removal of the ammonia produced in the reaction from the polymer melt.

A possible remedy in the case of a continuous or batchwise reaction is to use the precursor water in amounts which are much higher than stoichiometric in order to shift the reaction equilibrium to the required product side and/or to increase the reaction times, which is overall an energetically unfavorable procedure and may increase the proportion of unwanted byproducts or decomposition products. Another possible measure is to carry out the reaction in several reaction stages, consequently making the process technically elaborate.

A conventional industrial solution is a single-phase procedure for the hydrolysis and prepolymerization. However, this requires high operating pressures and pressure equipment suitable therefor, in order to keep volatile components—especially ammonia—in solution.

For heat and mass transfer in the single-phase procedure a plurality of separate items of apparatus is required for heat exchange and mixing.

The aim of a novel process should be to keep the range of residence times for the reaction narrow so that nonuniform reaction times, which have an adverse effect on product quality, do not occur.

It is an object of the present invention to develop a process for preparing polyamides which, because the costs of starting materials and energy are less and the complexity of the apparatus is reduced, operates more cost-effectively and, at the same time, increases the conversion of intermediates through an advantageous process control with improved removal of low boilers.

We have found that this object is achieved by a process for preparing polyamides, their oligomers or mixtures thereof, where appropriate with other reaction products, by reacting amino nitriles and, where appropriate, other polyamide-forming monomers and/or oligomers with water in a reactive distillation, wherein the reaction product is discharged from the bottom of the reactive distillation apparatus, and ammonia which is produced and, where appropriate, other low molecular weight compounds which are produced, and water, are taken off overhead.

The process is preferably carried out continously.

Reactive distillations per se are sufficiently well known from the area of low molecular weight industrial chemistry. By contrast, there are few descriptions of them in the area of high viscosity systems, in particular of polymerizations. U.S. Pat. No. 3,900,450 describes, for example, reactive distillation to prepare nylon 6,6.

The object is achieved by combining the reaction and thermal separation technique in a single apparatus (=reactive distillation), characterized by a two-phase procedure during hydrolysis and polymerization. This design of process is referred to as reactive distillation hereinafter. Examples of equipment used are columns with or without internals or bubble columns.

In one possible procedure, for example, amino nitrile and water are fed into the upper half of the column. The low boilers produced in the reaction (ammonia and water) can then be enriched in the top of the column and taken off, while the high boilers in the bottom product comprise the required product of oligomers and polyamide.

This integrated process control with continuous product removal results in ideal, parallel heat and mass transfer with higher exergetic efficiency which is moreover characterized by rapid heating of the precursors and homogeneous mixing thereof. The reaction can be carried out under autogenous pressure.

For the present reaction system, the countercurrent flow of prepolymer and the reaction product ammonia, combined with the continuous removal of ammonia via the overhead product from, for example, column or bubble column, ensures very low ammonia contents in the products of the apparatus which contain amino nitrites substantially converted into required products.

It has been found that the process according to the invention results in higher conversions to required product than without continuous removal of ammonia via the overhead product, which shortens the reaction time and reduces the formation of unwanted secondary components.

The reaction can be assisted by employing any suitable catalysts which speed up the hydrolysis and/or condensation. Preferred catalysts are those which either can be introduced in solid form and consequently easily be removed from the required product, or else are present as coating on parts of the column.

The invention relates to a, preferably continuous, process for the hydrolytic conversion of amino nitrites into polyamide and/or its precursors and, where appropriate, further polyamide-forming mono- and oligomers into polyamide.

It is possible to employ as reactive distillation apparatus all suitable apparatuses which allow the reactants to react and the ammonia which is produced and, where appropriate, water to be discharged as gases. The reactive distillation apparatus preferably has a plurality of theoretical separation stages. In a preferred embodiment of the invention, a plate column, bubble column or dividing wall column is employed as reactive distillation apparatus.

If plate columns are used, the amino nitrile is preferably metered onto an intermediate plate in the upper part of the column. The amino nitrile then flows under gravity downwards through the apparatus and, during this, reacts continuously with water. The resulting ammonia continuously rises upward, owing to its volatility, and is rectified.

The precursor or mixture of precursors is preferably metered in as a liquid, or part is fed in as a liquid and the remainder, e.g. steam, is fed as gas into the apparatus. The latter variant has the advantage that the vapor can additionally serve as energy carrier. Steam is frequently available as energy carrier at reasonable cost.

The apparatus is preferably designed so that the thermal equilibrium is substantially set up, depending on the residence time, on the real or theroetical plates inside the column employed.

If a dividing wall column or an apparatus operating on the principle of a dividing wall column is employed as apparatus, it is possible for unwanted or wanted components to be discharged as intermediate boilers and, if required, returned to the apparatus at another point. This procedure can reduce losses of starting materials.

The precursors can, if required, be preheated through the overhead condenser.

An outline of this type of the principle of the process according to the invention is shown in the drawing of FIG. 1:

Figure 1:
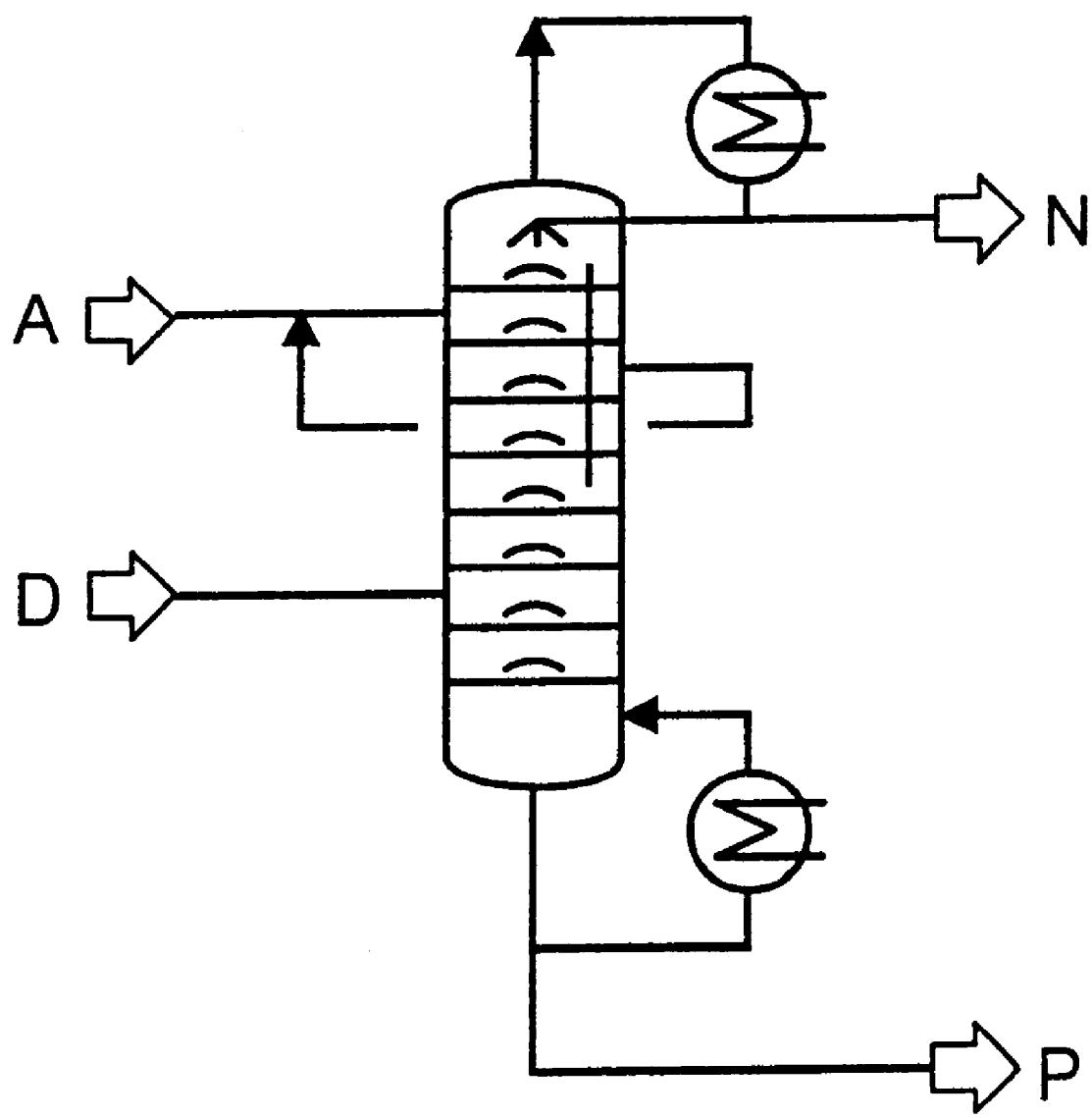
FIG. 1: Outline of a reactive distillation process for amino nitrites to polyamide by use of a plate column. The meanings in this are A: amino nitrile, D: steam, N: ammonia, P: polyamide prepolymer.

It has additionally been found that bubble columns can be employed as alternative to plate columns particularly preferably when the viscosity of the polyamide in the bottom product is greater than about 150 mPas, since caking on stationary parts of the column may then occur frequently. The feeding of precursors into bubble columns should take place at approximately the same positions as in a reactive distillation column, which means that the precursors are metered into the upper part of the bubble column. In order to reduce back mixing inside the column, the columns can, if required, be equipped with internals known to the skilled worker for reducing back mixing.

It has been found moreover that introducing catalyst pellets into the apparatus results in uniform gas and liquid flow in the column.

Ammonia reduction in the melt can be additionally assisted by stripping with inert gases (such as nitrogen). For this purpose, the gas is passed into one or more plates, or in the case of bubble columns at one or more points, by suitable devices.

It is possible to employ as amino nitrile in principle all amino nitrites, which means compounds which have both at least one amino group and at least one cyano group. Among these, ω-amino nitriles are preferred, employing from among the latter in particular ω-aminoalkyl nitriles having 4 to 12 C atoms, further preferably 4 to 9 C atoms in the alkylene radical, or an aminoalkylaryl nitrile having 8 to 13 C atoms, in which case those having an alkyl spacer with at least one C atom between the aromatic units and the amino group and cyano group are preferred. Particularly preferred aminoalkylaryl nitrites are those where the amino group and cyano group are relatively in 1,4 positions.

Further preference is given for employing linear ω-aminoalkyl nitrites as ω-aminoalkyl nitrile, where the alkylene radical (—CH$_2$—) preferably contains 4 to 12 C atoms, further preferably from 4 to 9 C atoms, such as 5-amino-1-cyanopentane (6-aminocapronitrile), 6-amino-1-cyclohexane, 7-amino-1-cyanoheptane, 8-amino-1-cyanooctane, 9-amino-1-cyanononane, particularly preferably 6-aminocapronitrile.

6-Aminocapronitrile is normally obtained by hydrogenating adiponitrile by known processes, for example as described in DE-A 836,938, DE-A 848,654 or U.S. Pat. No. 5,151,543.

It is, of course, also possible to employ mixtures of several aminonitriles or mixtures of an amino nitrile with other comonomers, for example caprolactam or the mixture defined in detail below.

Examples of other polyamide-forming monomers which can be employed are dicarboxylic acids such as alkanedicarboxylic acids having 6 to 12 carbon atoms, in particular 6 to 10 carbon atoms, such as adipic acid, pimelic acid, suberic acid, azelaic acid or sebacic acid, and terephthalic acid and isophthalic acid, diamines such as $C_4$–$C_{12}$-alkyldiamines, in particular having 4 to 8 carbon atoms, such as hexamethylene-diamine, tetramethylenediamine or octamethylenediamine, also m-xylylenediamine, bis (4-aminophenyl)methane, 2,2-bis (4-aminophenyl)propane or bis(aminocyclohexyl)-methane, and mixtures of dicarboxylic acids and diamines, each in any suitable combinations in relation to one another, but advantageously in the equivalent ratio. It is also possible to employ salts of said dicarboxylic acids and diamines, such as hexamethylenediammonium adipate, hexamethylenediammonium terephthalate, or tetramethylenediammonium adipate, hexamethylenediammonium terephthalate, but especially the salt of adipic acid and hexamethylenediamine, hexamethylenediammonium adipate (called AH salt), as constituent of a mixture with amino nitriles and/or lactams.

Dicarboxylic acids which can be employed are aliphatic $C_4$–$C_{10}$-α, ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8$–$C_{12}$-dicarboxylic acids such as terephthalic acid, and $C_5$–$C_8$-cycloalkanedicarboxylic acids such as cyclohexanedicarboxylic acids.

It is possible to employ as α,ω-diamine having 4 to 10 carbon atoms tetramethylenediamine, pentamethylenediamine, hexamethylenediamine, heptamethylenediamine, octamethylenediamine, nonamethylenediamine and decamethylenediamine, preferably hexamethylenediamine.

Aliphatic dinitriles such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile, are employed as α,ω-$C_2$–$C_{12}$-dinitrile.

It is also possible if desired to use diamines, dinitriles and amino nitriles derived from branched alkylenes or arylenes or alkylarylenes.

It is possible to employ as α,ω-$C_5$–$C_{12}$-amino acid 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid and 12-aminododecanoic acid, preferably 6-aminohexanoic acid. It is also possible to employ any suitable mixtures of said compounds, diamines and diacids.

Further suitable starting materials in the process according to the invention are mixtures with amino carboxylic acid compounds of the general formula I

$$H_2N—(CH_2)_m—C(O)R^1 \quad (I)$$

in which $R^1$ is —OH, —O—$C_{1-12}$-alkyl or —$NR^2R^3$, where $R^2$ and $R^3$ are, independently of one another, hydrogen, $C_{1-12}$-alkyl and $C_{5-8}$-cycloalkyl, and m is 3, 4, 5, 6, 7, 8, 9, 10, 11 or 12.

Particularly preferred amino carboxylic acid compounds are those in which $R^1$ is OH, —O—$C_{1-4}$-alkyl such as —O-methyl, —O-ethyl, —O-n-propyl, —O-i-propyl, —O-n-butyl, —O-sec-butyl, —O-tert-butyl and —$NR^2R^3$ such as —$NH_2$, —NHMe, —NHEt, —$NMe_2$ and —$NEt_2$, and m is 5.

Very particular preference is given to 6-aminocaproic acid, methyl 6-aminocaproate, ethyl 6-aminocaproate, 6-amino-N-methylcaproamide, 6-amino-N,N-dimethylcaproamide, 6-amino-N-ethylcaproamide, 6-amino-N,N-diethylcaproamide and 6-aminocaproamide.

The starting compounds are commercially available or can be prepared, for example, as disclosed in EP-A-0 234 295 and Ind. Eng. Chem. Process Des. Dev. 17 (1978) 9–16.

The polyamide-forming monomers preferably employed are amino nitrites as well as water, particularly preferably in a molar ratio in the range from 1:1 to 20, based on the complete process. Particular preference is given in this connection to aminocapronitrile with an ACN : water ratio of 1:1 to 6 in the complete process.

It is also possible to employ as polyamide-forming monomers mixtures of 1 to 99, preferably 20 to 99, in particular 50 to 99, % by weight of amino nitrites, 1 to 99, preferably 1 to 80, in particular 1 to 50, % by weight of lactams and 0 to 49% by weight of diamines and/or dicarboxylic acids or salts thereof.

It is also possible to employ mixtures of polyamide-forming monomers and oligomers.

The polyamide-forming monomers preferably employed are, beside aminocapronitrile, if required caprolactam and/or hexamethylenediammonium adipate ("AH salt").

The reaction can be carried out in the presence of Brönsted acid catalysts. Heterogeneous Brönsted acid catalysts are moreover preferably employed.

Suitable catalysts are in general besides many acidic catalysts described in the literature, such as phosphoric acid etc., in particular heterogeneous catalysts. Brönsted acid catalysts selected from a beta-zeolite catalyst, sheet silicate catalyst or a fixed bed catalyst which consists essentially of $TiO_2$ with 70 to 100% anatase and 0 to 30% rutile, in which up to 40% of the $TiO_2$ can be replaced by tungsten oxide, are preferably employed.

It is possible, for example, to use corresponding $TiO_2$ modifications available from Finnti (type S150).

The heterogeneous catalysts can be introduced into the apparatus for example as suspension, sintered onto packings or as optionally coated ordered or random catalyst packings or internals. They may also be present coated or distributed on the walls of the apparatus, so that removal from the reaction mixture is straightforward.

The water concentration on the majority of the theoretical or real plates located underneath the place where the amino nitrites are fed in reaches very high concentrations (high boilers : water molar ratio about 1:4 to 1:9) so that, even if the components are metered stoichiometrically into the apparatus, water may be present in more than the stoichiometric amount inside the apparatus itself, which may shift the reaction equilibrium to the product side and increase the rate on which equilibrium is set up.

The temperature for the reaction ought to be about 180° C. to 300° C., preferably 200 to 280° C. and, particularly preferably 220 to 270° C. in the reaction part of the column, that is to say underneath the precursor feed-in, depending on the water concentration, the residence time, the use of catalysts and the starting material composition or concentration. Since a temperature gradient develops along the columnlike apparatus, the temperature at the top and at the bottom may differ from the values mentioned.

The two-phase procedure allows the pressure level necessary for the reaction to be reduced since it is unnecessary to keep gaseous constituents in the liquid phase, as with a single-phase procedure. It is preferred for merely the autogenous pressure of the system to be set up, depending on the temperature. This is about 10 to 60 bar. The complexity of the apparatus is reduced through the integration of technical operations such as heat and mass transfer into one and the same apparatus.

With a large number of theoretical plates, the flow profile of the liquid phase in the apparatus approaches ideal plug flow, which results in a very uniform range of residence times in the apparatus.

Unwanted or wanted precursors or byproducts with a boiling point between ammonia and the polyamide prepolymer can be discharged through a dividing wall column.

The resulting required product has a molecular weight which can be adjusted within wide limits and which differs, and properties which differ, depending on the residence time in the apparatus, the process temperatures, the pressure conditions and other process parameters. It is possible if required to follow the reactive distillation by further processing of the product to adjust desired product properties. The resulting polyamide can, for example, be worked up by methods known per se, as described in detail, for example, in DE-A 43 21 683 (page 3, line 54 to page 4, line 3).

In a preferred embodiment, the content of cyclic dimer in the nylon 6 obtained according to the invention can be further reduced by extracting the nylon first with an aqueous solution of caprolactam and subsequently with water and/or subjecting it to gas-phase extraction (described in EP-A-0 284 968 for example). The low molecular weight constituents resulting from this after-treatment, such as caprolactam and its linear and cyclic oligomers, can be returned to the first and/or second and/or third stage.

The process according to the invention is distinguished by carrying out the reaction continuously, the costs of energy and starting materials being reduced and the apparatus being comparatively uncomplicated. The continuous removal of product increases the conversion and the reaction rate to give the required product by comparison with the batchwise process and, at the same time, byproduct formation is reduced. The process can operate more cost-effectively and provide a product of higher quality than known processes.

The invention is illustrated further by means of Examples hereinafter.

Examples

Experiments carried out in a pressure vessel and describing the course of the reaction are described as examples. Examples which indicate the use of suitable columns are additionally mentioned.

Reaction Examples

Reaction Example R1 (continuous degassing):

1400 g of a reaction mixture of aminocapronitrile and water in the molar ratio 1:4 were stirred at 250° C. in a 2 liter pressure vessel with heating jacket and anchor stirrer. The autogenous pressure set up was 43 bar. During the reaction time of 3 hours, water was continuously fed into the reactor at a mass flow rate of 100 g/h. A water/ammonia mixture was likewise continuously discharged from the gas phase through an overflow valve.

Reaction Example R2 (continuous degassing):

1400 g of a reaction mixture of aminocapronitrile and water in the molar ratio 1:0.8 were stirred at 250° C. in a 2 liter pressure vessel with heating jacket and anchor stirrer. The autogenous pressure set up was 27 bar. During the reaction time of 3 hours, water was continuously fed into the reactor at a mass flow rate of 100 g/h. A water/ammonia mixture was likewise continuously discharged from the gas phase through an overflow valve.

Comparative Example C1 (batchwise):

1400 g of a reaction mixture of aminocapronitrile and water in the molar ratio 1:4 was stirred at 250° C. in a pressure vessel with heating jacket and anchor stirrer and with the reactor closed. The autogenous pressure set up was 48 bar. The experiment lasted 2 hours.

Comparative Example C2 (batchwise):

1400 g of a reaction mixture of aminocapronitrile and water in the molar ratio 1:1 was stirred at 250° C. in a 2 liter pressure vessel with heating jacket and anchor stirrer and with the reactor closed. The autogenous pressure set up was 33 bar. The experiment lasted 200 minutes.

The Examples show that the conversion is significantly higher and the proportion of higher oligomers increases even in a one-stage removal of lower-boiling reaction products by a continuous countercurrent with water. This effect is, of course, even greater in reactive distillation with many rectification stages.

TABLE I

Results of the reaction of amino nitriles

| Example | Reaction time [min] | ACN:H₂O molar ratio | T [° C.] | ACN | di-hexa ACN | AC | di AC | tri AC | ACA | di ACA | tri ACA | CL | di CL | tri CL | higher oligos | ACN conversion |
|---|---|---|---|---|---|---|---|---|---|---|---|---|---|---|---|---|
| R1 | 180 | 1:4 | 250 | 0.1 |  | 0.8 | 1.0 | 1.1 | 0.5 | 0.6 | 0.5 | 17.0 | 1.0 | 0.2 | 41.2 | >99% |
| R2 | 180 | 1:0.8 | 250 | 35.3 | 25.2 | 0.9 | 0.9 | 0.9 | 0.4 | 0.3 | 0.1 | 8.4 | 0.1 | — | 28.7 | 60.1% |
| C1 | 120 | 1:4 | 250 | 2.2 | 9.3 | 0.8 | 0.8 | 0.8 | 2.1 | 2.0 | 1.8 | 16.0 | 0.6 | 0.1 | 27.5 | 96.7% |
| C2 | 200 | 1:1 | 250 | 30.9 | 25.5 | 0.1 | 0.1 | 0.1 | 0.9 | 0.6 | 0.2 | 9.1 | >0.1 | >0.1 | 0 | 36% |

The data for the following substances are percent by mass based on the complete batch:
ACN: aminocapronitrile
ACA: aminocaproamide
AC: aminocaproic acid
CL: caprolactam
Oligos: oligomers with a degree of polymerization greater than 3
tri: trimer
di: dimer
di-hexa: dimer to hexamer.

Column Examples (continuous):

Column Example 1

A plate column with 30 bubble plates was operated with a system pressure of 30 bar. 10.1 kg/h aminocapronitrile were metered onto plate 29, the plate below the top one, at 250° C. 2.5 kg/h of steam superheated to 300° C. were fed in onto plate 2. The hydrodynamic residence time of the reaction mixture in the column was 2.3 h. The resulting overhead product was ammonia with a content of 0.1% by weight of water at about 70° C. The bottom product was a nylon 6 pre-polymer with a water content of 8.5% by weight. The content of water on the plates below the feed point was up to about 50% by weight or, converted, about 80 mol %.

Column Example 2

A plate column with 30 bubble plates was operated with a system pressure of 30 bar. A mixture of 8.4 kg/h aminocapronitrile and 1.5 kg/h water at 250° C. was fed in onto plate 29, the plate below the top one. 2 kg/h of steam superheated to 300° C. were fed in onto plate 2. The hydrodynamic residence time of the reaction mixture in the column was 2.8 h. The resulting overhead product was ammonia with a content of 2% by weight water. The bottom product was a nylon 6 prepolymer with a water content of 8.7% by weight. A forced circulation evaporator was located at the foot of the column.

Column Example 3

A mixture of 5 kg/h aminocapronitrile and 2 kg/h water was fed below the top sieve plate into a bubble column which was packed with cylindrical catalyst pellets of diameter 3 mm and length 5 mm and was divided by sieve plates into 6 zones. A pipe with a random packing and a diameter exceeding the column diameter was located as rectifier above the feed point. A forced circulation evaporator was located at the foot of the bubble column. The hydrodynamic residence time in the bubble column with random packing was 2.3 h. The pressure set up in the column was about 32 bar. The bottom product was a polyamide prepolymer with a water content of 11% by weight. The head product was ammonia with 2% by weight of water.

We claim:

1. A continuous reactive distillation process for preparing polyamides, their oligomers or mixtures thereof, which process comprises reacting amino nitriles and optionally other polyamide-forming monomers and/or oligomers, with water counter-currently in a reactive distillation apparatus having a plurality of theoretical or real separation stages; and discharging reaction product from the bottom of the reactive distillation apparatus and taking off ammonia and water from overhead.

2. A process as claimed in claim 1, wherein the reaction is carried out under autogenous pressure.

3. A process as claimed in claim 1, wherein the reactive distillation apparatus is a plate column, bubble column or dividing wall column.

4. A process as claimed in claim 1, wherein amino nitriles, as polyamide-forming monomers, and water are employed in a molar ratio in the range from 1:1 to 1:20.

5. A process as claimed in claim 1, wherein mixtures of 1 to 99% by weight amino nitrites, 1 to 99% by weight lactams and 0 to 49% by weight diamines and/or dicarboxylic acids or salts thereof are employed as polyamide-forming monomers.

6. A process as claimed in claim 1, wherein the reactive distillation is carried out in the presence of Brönsted acid catalysts.

7. A process as claimed in claim 6, wherein heterogeneous Brönsted acid catalysts are employed.

8. A process as claimed in claim 1, wherein water is employed in the form of steam.

9. A process as claimed in claim 1, wherein additional stripping with an inert gas is carried out in the reactive distillation.

* * * * *